US005635457A

United States Patent [19]
Van Slyke

[11] Patent Number: 5,635,457
[45] Date of Patent: Jun. 3, 1997

[54] NON-TOXIC, INEXPENSIVE SYNTHETIC DRILLING FLUID

[75] Inventor: Donald C. Van Slyke, Brea, Calif.

[73] Assignee: Union Oil Company of California, El Segundo, Calif.

[21] Appl. No.: 422,476

[22] Filed: Apr. 17, 1995

[51] Int. Cl.$^6$ ................ C09K 7/06; C09K 7/02
[52] U.S. Cl. .................. 507/103; 507/137; 507/910
[58] Field of Search ..................... 507/103, 137

[56] References Cited

U.S. PATENT DOCUMENTS

| | | | |
|---|---|---|---|
| 2,816,073 | 12/1957 | Stratton | 252/8.5 |
| 3,878,117 | 4/1975 | Williams et al. | 252/47 |
| 3,912,683 | 10/1975 | O'Farrell | 260/29.7 |
| 3,954,627 | 5/1976 | Dreher et al. | 252/8.5 P |
| 4,007,149 | 2/1977 | Burton et al. | 260/29.7 B |
| 4,012,329 | 3/1977 | Hayes et al. | 252/8.5 P |
| 4,148,821 | 4/1979 | Nussbaum et al. | 260/505 |
| 4,153,588 | 5/1979 | Makowski et al. | 260/23.5 |
| 4,390,474 | 6/1983 | Nussbaum et al. | 260/505 |
| 4,425,462 | 1/1984 | Turner et al. | 524/400 |
| 4,447,338 | 5/1984 | Lundberg et al. | 252/8.5 M |
| 4,488,975 | 12/1984 | Almond | 252/8.55 R |
| 4,552,215 | 11/1985 | Almond | 166/278 |
| 4,553,601 | 11/1985 | Almond et al. | 166/308 |
| 4,671,883 | 6/1987 | Connell et al. | 252/8.515 |
| 4,787,990 | 11/1988 | Boyd | 252/8.511 |
| 4,810,355 | 3/1989 | Hopkins | 208/58 |
| 4,900,456 | 2/1990 | Ogilvy | 252/8.551 |
| 5,096,883 | 3/1992 | Mercer et al. | 507/103 |
| 5,189,012 | 2/1993 | Patel et al. | 507/103 |
| 5,333,698 | 8/1994 | Van Slyke | 175/65 |

FOREIGN PATENT DOCUMENTS

| | | |
|---|---|---|
| 0247801 | 12/1987 | European Pat. Off. . |
| 0254412 | 1/1988 | European Pat. Off. . |
| 2166782 | 5/1986 | United Kingdom . |
| 2212192 | 7/1989 | United Kingdom . |
| 8302949 | 9/1983 | WIPO . |
| WO94/16030 | 7/1994 | WIPO . |

OTHER PUBLICATIONS

C&EN, Jun. 12, 1989, "Science/Technology Concentrates," p. 21.
European Chemical News, 29 Jul. 1991, "ECN Technology," p. 20.
Oil & Gas Journal, Feb. 17, 1986, Technology, "Process Makes Mid–Distillates from Natural Gas," pp. 74–76.
Bartholomew, C. H., Catalysis Letters 7 (1990), "Recent Technological Developments in Fischer–Tropsch Catalysis," J. C. Baltzer A.G., Scientific Pub. Co., pp. 303–315. Improper citation (No Date).
Dry, M. E., *Hydrocarbon Processing*, Aug. 1982, "Sasol's Fischer–Tropsch Experience," pp. 121–124.
Boyd et al., "New Base Oil Used in Low–Toxicity Oil Muds," *Society of Petroleum Engineers of AIME*, Jan. 1985, pp. 137–141.
Dry, M. E., "The Sasol Fischer–Tropsch Processes," *Applied Industrial Catalysis*, vol. 2, Chapter 5, Academic Press, Inc., (1983), pp. 167–213.
Dry, M. E., "Commercial Conversion of Carbon Monoxide to Fuels and Chemcials," *Journal of Organometallic Chemistry*, 372 (1989), pp. 117–127.
Eilers et al., "The Shell Middle Distillate Synthesis Process (SMDS)," *Catalysis Letters* 7 (1990), pp. 253–269, J.C. Baltzer A. G., Scientific Pub. Co.
Fiero, G. W., "Purity of White Mineral Oil," vol. 23, pp. 226–231 (May, 1965).
Gregor, J. H. "Fischer–Tropsch Products as Liquid Fuels or Chemiclas," *Catalysis Letters* 7 (1990), pp. 317–331, J. C. Baltzer A. G., Scientific Pub. Co.
O'Connor et al., "Cetane Number Determination of Synthetic Diesel Fuels," *FUEL*, 1992, vol. 71, Nov., pp. 1323–1327.
Quann et al., "Chemistry of Olefin Oligomerization Over ZSM–5 Catalyst," *Ind. Eng. Chem. Res.*, vol. 27, 1988, pp. 565–570.
Sie et al., "Conversion of Natural Gas to Transportation Fuels via The Shell Middle Distillate Synthesis Process (SMDS)," *Catalysis Today*, 8 (1991) pp. 371–394, Elsevier Science Pub. V.B., Amsterdam.
Tabak et al., "Conversion of Propylene and Butylene Over ZSM–5 Catalyst," *AIChE Journal*, vol. 32, No. 9, Sep. 1986, pp. 1526–1531.
van der Burgst et al., "The Shell Middle Distillate Synthesis Process," The Institute of Petroleum, *Petroleum Review*, Apr. 1990, pp. 204–209.
Watson et al., *Journal of Industrial and Engineering Chemistry*, 27 (12); pp. 1460–1463, (Dec. 1935).

*Primary Examiner*—David B. Springer
*Attorney, Agent, or Firm*—Gregory F. Wirzbicki; Shlomo R. Frieman

[57] ABSTRACT

A non-toxic, inexpensive synthetic fluid for use in wellbore fluids (e.g., drilling fluids) is selected from the group consisting of (A) fluids having (I) a pour point greater than about −30° C. (−22° F.) and (II) a cetane index greater than 50, and comprising (i) at least about 95 weight percent hydrocarbons containing 11 or more carbon atoms, (ii) greater than 5 weight percent hydrocarbons containing 18 or more carbon atoms, (iii) at least about 50 weight percent isoparaffins, (iv) at least about 80 weight percent total paraffins, (v) less than 10 weight percent naphthenics, (vi) less than 0.1 weight percent aromatics, and (vii) at least 2 hydrocarbons containing a consecutive number of carbon atoms, and (B) fluids comprising (i) at least about 95 weight percent hydrocarbons containing 10 or more carbon atoms and (ii) at least about 90 weight percent n-paraffins.

170 Claims, No Drawings

NON-TOXIC, INEXPENSIVE SYNTHETIC DRILLING FLUID

BACKGROUND

The present invention relates to wellbore fluids (especially, synthetic fluid-based drilling fluids) and systems and processes for using them in a subterranean formation in oil and gas recovery operations.

While drilling fluids employing synthetic fluids (such as polyalphaolefin- and ester-based drilling fluids) as the base fluid are capable of achieving 96 hour $LC_{50}$ Mysid shrimp (*Mysidopsis bahia*) bioassay test results greater than 500,000 ppm, their commercial use has been severely restricted because of the high cost of the synthetic fluids.

SUMMARY OF THE INVENTION

Accordingly, there is a need for a drilling fluid which employs an inexpensive, non-toxic synthetic fluid as the base fluid. The present invention satisfies this need by providing a drilling fluid comprising (a) at least one drilling fluid additive (e.g., an emulsifier, a viscosifier, a weighting agent, and an oil-wetting agent) and (b) an inexpensive, non-toxic base fluid. In one embodiment of the invention, the base fluid is a synthetic fluid having a pour point greater than about $-30°$ C. ($-22°$ F.) and comprising (i) at least about 95 weight percent hydrocarbons containing 11 or more carbon atoms, (ii) greater than 5 weight percent hydrocarbons containing 18 or more carbon atoms, (iii) at least about 50 weight percent isoparaffins, (iv) at least about 80 weight percent total paraffins, (v) at least 2 hydrocarbons containing a consecutive number of carbon atoms, (vi) less than about 10 weight percent naphthenics, and (vii) less than about 0.1 weight percent aromatics. (This synthetic fluid is referred to hereinafter as the "isoparaffin synthetic fluid.")

In another embodiment, the synthetic fluid comprises (1) at least about 95 weight percent hydrocarbons containing 10 or more carbon atoms and (2) at least about 90 weight percent n-paraffins. (This synthetic fluid is referred to hereinafter as the "n-paraffin synthetic fluid.") The n-paraffins usually also contain (i) less than about 10 weight percent naphthenics and (ii) less than about 0.1 weight percent aromatics.

Typically, both the isoparaffin and n-paraffin synthetic fluids contain (i) less than about 1 weight percent sulfur, (ii) less than about 1 weight percent nitrogen, and (iii) less than about 1 weight percent oxygenated compounds.

The cost of the synthetic fluids employed in the present invention is comparable to that of diesel because the synthetic fluids are made by reacting inexpensive raw materials (e.g., $H_2$ and CO) on a massive scale designed to supply synthetic substitutes for gas oil and/or kerosene produced at conventional oil refineries. In contrast, polyalphaolefins and esters are made by polymerizing or reacting expensive raw materials on a small or moderate scale.

Because prior toxicity studies have shown that aromatics, sulfur, nitrogen, and oxygenated compounds can be toxic, the low or substantially non-existent concentrations of these materials in the synthetic fluids used in the present invention is very desirable. In addition, the fluids employed in the present invention which are in fact made synthetically are also desirable in view of anticipated environmental regulations which may restrict the off-shore discharge of non-aqueous-base drilling fluids to those drilling fluids using a synthetically produced base fluid.

A drilling system and a method for drilling a borehole are also provided by the invention. The drilling system comprises (a) at least one subterranean formation, (b) a borehole penetrating a portion of at least one of the subterranean formations, (c) a drill bit suspended in the borehole, and (d) the above drilling fluid located in the borehole and proximate the drill bit. The drilling method comprises the steps of (a) rotating a drill bit at the bottom of the borehole and (b) introducing the aforesaid drilling fluid into the borehole (i) to pick up drill cuttings and (ii) to carry at least a portion of the drill cuttings out of the borehole.

DETAILED DESCRIPTION OF THE INVENTION

At least 95 weight percent of the isoparaffin synthetic drilling fluid is generally composed of compounds containing 11 or more carbon atoms. Commonly, at least 95 weight percent of the isoparaffin synthetic drilling fluid is composed of compounds containing 12 or more, more commonly 13 or more, even more commonly 14 or more, and most commonly 15 or more carbon atoms. Also, the isoparaffin synthetic fluid consists of greater than 5, typically greater than 10, more typically greater than 15, even more typically greater than 20, and most typically greater than 25, weight percent compounds containing more than 17 carbon atoms. In fact, compounds containing 18 or more carbon atoms can constitute about 30, 35, 40, or even 50 or more weight percent of the isoparaffin synthetic fluid. In addition, the isoparaffin synthetic fluid can contain isoparaffin, naphthenic, aromatic, sulfur, nitrogen, oxygenate, and total paraffin compounds in concentrations independently set forth in the following Table I.

TABLE I

| Isoparaffin Synthetic Fluid Composition | | | | | | |
|---|---|---|---|---|---|---|
| Isoparaffin[a], wt % | Naphthenic[b], wt % | Aromatic[c], wt % | Sulfur[d], wt % | Nitrogen[e], wt % | Oxygenates[f], wt % | Total Paraffins[g], wt % |
| $\geq 50$ | $\leq 10$ | $\leq 0.1$ | $\leq 1$ | $\leq 1$ | $\leq 1$ | $\geq 80$ |
| $\geq 60$ | $\leq 5$ | $\leq 0.05$ | $\leq 0.5$ | $\leq 0.5$ | $\leq 0.5$ | $\geq 82.5$ |
| $\geq 70$ | $\leq 1$ | $\leq 0.01$ | $\leq 0.1$ | $\leq 0.1$ | $\leq 0.1$ | $\geq 85$ |
| $\geq 80$ | $\leq 0.5$ | $\leq 0.005$ | $\leq 0.05$ | $\leq 0.05$ | $\leq 0.05$ | $\geq 87.5$ |
| $\geq 90$ | $\leq 0.1$ | $\leq 0.001$ | $\leq 0.01$ | $\leq 0.01$ | $\leq 0.01$ | $\geq 90$ |

TABLE I-continued

| Isoparaffin Synthetic Fluid Composition | | | | | | |
|---|---|---|---|---|---|---|
| Isoparaffin[a], wt % | Naphthenic[b], wt % | Aromatic[c], wt % | Sulfur[d], wt % | Nitrogen[e], wt % | Oxygenates[f], wt % | Total Paraffins[g], wt % |
| ≧95 | ≦0.05 | ≦0.0005 | ≦0.005 | ≦0.005 | ≦0.005 | ≧92.5 |
| ≧96 | ≦0.01 | ≦0.0001 | ≦0.001 | ≦0.001 | ≦0.001 | ≧95 |
| ≧97 | ≦0.005 | | ≦0.0005 | ≦0.0005 | ≦0.0005 | ≧96 |
| ≧98 | ≦0.001 | | ≦0.0001 | ≦0.0001 | ≦0.0001 | ≧97 |
| ≧99 | ≦0.0005 | | | | | ≧98 |
| | ≦0.0001 | | | | | ≧99 |

[a]As determined by ASTM D 5186
[b]As determined by UTM 407–90.
[c]As determined by ASTM D 2887.
[d]As determined by ASTM D 2622.
[e]As determined by ASTM D 4629.
[f]As determined by UTM 484.
[g]As determined by ASTM D 2887.

The pour point of the isoparaffin synthetic fluid (as determined by ASTM D 97) is commonly greater than about $-30°$ C. ($-22°$ F.), more commonly greater than about $-25°$ C. ($-13°$ F.), even more commonly greater than about $-20°$ C. ($-4°$ F.), and most commonly greater than about $-15°$ C. ($5°$ F.). Usually, the pour point of the isoparaffin synthetic fluid is less than about $0°$ C. ($32°$ F.).

The flash point of the isoparaffin synthetic fluid (as determined by ASTM D 93) is at least about $65.6°$ C. ($150°$ F.), typically at least about $71.1°$ C. ($160°$ F.), more typically about $79.4°$ C. ($175°$ F.), even more typically at least about $82.2°$ C. ($180°$ F.), and most typically at least about $85°$ C. ($185°$ F.). Usually, the flash point of the isoparaffin synthetic fluid is less than $90°$ C. ($194°$ F.) and more typically about $89°$ C. ($192.2°$ F.) or less.

The isoparaffin synthetic fluid frequently has an initial boiling point of at least about $175°$ C. ($347°$ F.), more frequently at least about $180°$ C. ($356°$ F.), even more frequently at least about $185°$ C. ($365°$ F.), and most frequently at least about $190°$ C. ($374°$ F.) or even at least about $200°$ C. ($392°$ F.). In addition, the isoparaffin synthetic fluid commonly has a final boiling point of at least about $350°$ C. ($662°$ F.), more commonly at least about $352°$ C. ($665.6°$ F.), even more commonly at least about $354°$ C. ($669.2°$ F.), and most commonly at least about $356°$ C. ($672.8°$ F.). Furthermore, the final boiling point of the isoparaffin synthetic fluid is typically about $375°$ C. ($707°$ F.) or less, more typically about $370°$ C. ($698°$ F.) or less, even more typically about $365°$ C. ($689°$ F.) or less, and most typically about $360°$ C. ($680°$ F.) or less.

The viscosity of the isoparaffin synthetic fluid at $40°$ C. ($104°$ F.) (as measured by ASTM D 445) is ordinarily between about 1 to about 10 centistokes (cst). Preferably, the viscosity of the isoparaffin synthetic fluid at $40°$ C. ($104°$ F.) is less than about 8, more preferably less than about 7, even more preferably less than about 6, and most preferably less than about 5, cst.

At $15°$ C., the isoparaffin synthetic fluids commonly have an API gravity greater than about $40°$, more commonly greater than about $42°$, even more commonly greater than about $44°$, and most commonly greater than about $46°$.

The cetane index (as determined by ASTM D 976) is generally greater than about 60, preferably greater than about 62, more preferably greater than about 64, even more preferably greater than about 66, and most preferably greater than about 68. In fact, the cetane index is frequently at least about 70, 71, 73, 74, or about 75 or more.

An isoparaffin synthetic fluid commercially available from MDS(Malaysia) typically has the properties set forth in the following Table II.

TABLE II

| Typical Gasoil Properties | | |
|---|---|---|
| Property | Value | Test Method |
| ASTM Color | 0 | ASTM D 1500 |
| Distillation Range, °C. | | ASTM D 86 |
| IBP | 201 | |
| 5% | 219 | |
| 50% | 271 | |
| 95% | 353 | |
| FBP | 358 | |
| Sulphur, ppm | 0 | ASTM D 1266 |
| Cetane Index | 75 | ASTM D 976 |
| Flash Point, °C. | 88 | ASTM D 93 |
| Pour Point, °C. | −7 | ASTM D 97 |
| Cloud Point, °C. | −2 | ASTM D 2500 |
| CFPP, °C. | −3 | IP 309 |
| Aromatics, % v | <0.1 | ASTM D 5186 |
| API Gravity at 15° C., ° | 48.75 | |

Another isoparaffin synthetic fluid, which is commercially available from Sasol, has the properties shown in the following Table III.

TABLE III

| Typical Gasoil Properties | | |
|---|---|---|
| Property | Value | Test Method |
| Density at 20° C., kg/l | 0.778–0.785 | ASTM D 1298 |
| Color, Saybolt | +30 | ASTM D 156 |
| Distillation Range at 101.3 kPals | | ASTM D 1078 |
| IBP, °C. | 200 min. | |
| FBP, °C. | 250 max. | |
| Sulphur, % mass | <0.01 | ASTM D 2622 |
| Flash Point (closed cup at 101.3 kPa), °C. | 77 | IP 170 |
| Kinematic Viscosity at 40° C. | 1.6–2.1 | ASTM D 445 |
| Aromatics, % mass | 1 max. | GC |
| Water, % mass | 0.01 | ASTM D 1744 |
| Acidity, mgKOH/G | 0.01 | ASTM D 3242 |
| Ash, % mass | 0.01 | ASTM D 482 |
| Ionol content, mg/kg | 900–1100 | GC |

When the isoparaffin synthetic fluids are employed as the base fluid in a drilling mud, the base oil generally contains less than 1, preferably less than about 0.9, more preferably less than 0.8, even more preferably less than about 0.7, and most preferably less than about 0.6, weight percent polar activator (e.g., polar ether alcohols). In fact, the concentration of polar activators in the base fluid is commonly less than about 0.5, more commonly less than about 0.4, even more commonly less than about 0.3, and most commonly less than about 0.2, weight percent. In addition, the base fluid can contain less than about 0.1, 0.05, 0.01, 0.005, 0.001, weight percent polar activator or even be totally devoid of any polar activator. Furthermore, when the base fluid is the isoparaffin synthetic fluid, the entire drilling mud usually contains less than 1, preferably less than about 0.75, more preferably less than 0.5, even more preferably less than about 0.25, and most preferably less than about 0.1, weight percent polar activator. In fact, in such instances the drilling mud can contain less than about 0.05, 0.01, 0.005, 0.001, weight percent polar activator or be entirely devoid of any polar activator.

With respect to the n-paraffin synthetic fluid, at least 95 weight percent of the n-paraffin synthetic drilling fluid is generally composed of compounds containing 10 or more carbon atoms. Typically, at least 95 weight percent of the n-paraffin synthetic drilling fluid is composed of compounds containing 11 or more, more typically 12 or more, even more typically 13 or more, and most typically 14 or more carbon atoms. Usually, the n-paraffin synthetic fluid contains less than about 5, more commonly less than 3, even more commonly less than about 2, and most commonly less than about 1, weight percent of compounds containing 18 or more carbon atoms. In addition, the n-paraffin synthetic fluid can contain n-paraffin, iso-paraffin, naphthenic, aromatic, sulfur, nitrogen, and oxygenate compounds in concentrations independently listed in the following Table IV.

The pour point of the n-paraffin synthetic fluid (as determined by ASTM D 97) is commonly greater than about −30° C. (−22° F.) and more commonly greater than about −25° C. (−13° F.). Frequently, the pour point of the n-paraffin synthetic fluid is less than about 10° C. (50° F.), more frequently less than about 9° C. (48.2° F.), even more frequently less than about 8° C. (46.4° F.), and most frequently less than about 7° C. (44.6° F.).

The flash point of the n-paraffin synthetic fluid (as determined by ASTM D 93) is typically at least about 65° C. (149° F.), more typically at least about 70° C. (158° F.), even more typically at least about 75° C. (167° F.), and most typically at least about 80° C. (176° F.). The n-paraffin synthetic fluids can have even higher flash points, such as at least about 85° C. (185° F.), 90° C. (194° F.), 95° C. (203° F.), or at least about 100° C. (212° F.) or higher.

The n-paraffin synthetic fluid frequently has an initial boiling point of at least about 190° C. (374° F.), more frequently at least about 200° C. (392° F.), even more frequently at least about 210° C. (410° F.), and most frequently at least about 220° C. (428° F.). Even higher initial boiling points, such as about 230° C. (446° F.), 240° (464° F.), or 250° C. (482° F.) or more, are not unusual for the n-paraffin synthetic fluids.

The viscosity of the n-paraffin synthetic fluid at 40° C. (104° F.) (as measured by ASTM D 445) is ordinarily between about 1 to about 10 cst. Preferably, the viscosity of the n-paraffin synthetic fluid at 40° C. (104° F.) is less than about 5, more preferably less than about 4, even more preferably less than about 3, and most preferably less than about 2, cst.

At 15° C., the n-paraffin synthetic fluids commonly have an API gravity greater than about 45°, more commonly greater than about 50°, even more commonly greater than about 50.5°, and most commonly greater than about 51°.

Typical properties for some commercially available n-paraffin synthetic fluids are shown in the following Tables V and VI.

TABLE IV

| N-paraffin Synthetic Fluid Composition | | | | | | |
|---|---|---|---|---|---|---|
| N-paraffin[a], wt % | Naphthenic[b], wt % | Aromatic[c], wt % | Sulfur[d], wt % | Nitrogen[e], wt % | Oxygenates[f], wt % | Isoparaffins[g], wt % |
| ≧90 | ≦10 | ≦0.1 | ≦1 | ≦1 | ≦1 | ≦10 |
| ≧91 | ≦5 | ≦0.05 | ≦0.5 | ≦0.5 | ≦0.5 | ≦9 |
| ≧92 | ≦1 | ≦0.01 | ≦0.1 | ≦0.1 | ≦0.1 | ≦8 |
| ≧93 | ≦0.5 | ≦0.005 | ≦0.05 | ≦0.05 | ≦0.05 | ≦7 |
| ≧94 | ≦0.1 | ≦0.001 | ≦0.01 | ≦0.01 | ≦0.01 | ≦6 |
| ≧95 | ≦0.05 | ≦0.0005 | ≦0.005 | ≦0.005 | ≦0.005 | ≦5 |
| ≧96 | ≦0.01 | ≦0.0001 | ≦0.001 | ≦0.001 | ≦0.001 | ≧4 |
| ≧97 | ≦0.005 | | ≦0.0005 | ≦0.0005 | ≦0.0005 | ≧3 |
| | ≦0.001 | | ≦0.0001 | ≦0.0001 | ≦0.0001 | ≧2 |
| | ≦0.0005 | | | | | ≧1 |
| | ≦0.0001 | | | | | |

[a]As determined by Sasol 5.107/92.
[b]As determined by UTM 407-90.
[c]As determined by ASTM D 5186.
[d]As determined by ASTM D 2622.
[e]As determined by ASTM D 4629.
[f]As determined by UTM 484.
[g]As determined by ASTM D 2887.

TABLE V

Typical Properties Of MDS(Malaysia) Brand N-paraffin Synthetic Fluids

| Property | Sarapar 103 | Sarapar 147 | Test Method |
|---|---|---|---|
| Saybolt Color | +30 | +30 | ASTM D 156 |
| Bromine Index, mgBr/ | 8 | 6 | ASTM D 2710 |

TABLE V-continued

Typical Properties Of MDS(Malaysia) Brand N-paraffin Synthetic Fluids

| Property | Sarapar 103 | Sarapar 147 | Test Method |
|---|---|---|---|
| 100 g Sulphur, ppm | 0 | 0 | ASTM D 5120 |
| Carbon Distribution, % mass | | | |
| nC9 | 0 | 0 | |
| nC10 | 9 | 0 | |
| nC11 | 30 | 0 | |
| nC12 | 29 | 0 | |
| nC13 | 27 | 4 | |
| nC14 | 1 | 25 | |
| nC15 | 0 | 24 | |
| nC16 | 0 | 22 | |
| nC17 | 0 | 16 | |
| nC18 | 0 | 4 | |
| nC19 | 0 | 0 | |
| n-Paraffin content, % mass | 96 | 95 | |
| Average Molecular Mass | 167 | 213 | |
| Density at 15° C., kg/m$^3$ | 750 | 775 | ASTM D 4052 |
| Distillation Range, °C. | | | ASTM D 86 |
| IBP | 190 | 250 | |
| FBP | 230 | 280 | |
| Flash Point, °C. | 75 | 110 | ASTM D 93 |
| Pour Point, °C. | −20 | 5 | ASTM D 97 |
| Viscosity at 25° C., mm/s | 1.7 | 3.3 | ASTM D 445 |
| API Gravity at 15° C., ° | 57.17 | 51.08 | |

8:371–394 (1991); van der Burgt et al., *Petroleum Review*, pages 204–209 (April 1990); *Oil & Gas Journal*, pages 74–76 (Feb. 17, 1986); Eilers et al., *Catalysis Letters*, pages 253–270 (1990); Bartholomew, *Catalysis Letters*, pages 303–316 (1990); Gregor, *Catalysis Letters*, pages 317–332 (1990); Dry, *Journal of Organometallic Chemistry*, 372:117–127 (1989); Dry, *Applied Industrial Catalysis*, 2:167–213 (1983); and Dry, *Hydrocarbon Processing*, pages 121–124 (August 1982), these publications being incorporated herein in their entireties by reference. In general, the Fischer-Tropsch process entails reacting carbon monoxide and hydrogen over a catalyst (e.g., iron, ruthenium, or cobalt) to produce products which, in the absence of secondary transformations, are highly linear. When desired, some or all of the linear products are subjected to a conversion process (such as the Shell Middle Distillate Synthesis Process) where (a) olefins present in the Fischer-Tropsch product are hydrogenated, (b) small amounts of oxygen-containing compounds, mainly primary alcohols, are removed, (c) the Fischer-Tropsch product is hydroisomerized, and (d) the n-paraffins are hydrocracked to isoparaffins of a desired chain length and/or boiling range.

Due to the manner in which they are synthesized, the synthetic fluids are composed of hydrocarbons containing a consecutive number of carbon atoms (i.e., a mixture of hydrocarbons where the carbon atom content of the individual hydrocarbons is $C_n$, $C_{n+1}$, $C_{n+2}$, $C_{n+3}$, etc. and n is a whole number.) Generally, the synthetic fluids are composed of at least 2, more commonly at least 3, even more commonly at least 4, and most commonly at least 5 hydrocar-

TABLE VI

Typical Properties of Sasol Brand N-paraffin Synthetic Fluids

| | Paraffins | | | | |
|---|---|---|---|---|---|
| | Light | | Heavy | | |
| Property | Specification | Typical | Specification | Typical | Test Method |
| n-Paraffins, % mass | 92 min. | 93 | 92 min. | 93 | Sasol 11.28/83 |
| Aromatics, % mass | 0.5 max. | <0.1 | 0.5 max. | <0.1 | Sasol 5.107/92 |
| Bromine Index, mgBr/100 g | 20 max. | <10 | 20 max. | <10 | ASTM D 2710-89 |
| Sulphur, ppm | 5 max. | <1 | 5 max. | <1 | ANTEK 1.211/92 |
| Acidity, mg KOH/G | 0.02 max. | <0.01 | 0.02 max. | <0.01 | ASTM D 3242 |
| Ash, % mass | 0.03 max. | <0.01 | 0.03 max. | <0.01 | ASTM D 482 |
| Saybolt Color | +30 min. | +30 | +25 min | +30 | ASTM D 156 |
| Carbon Distribution, % mass | | | | | Sasol 11.28/83 |
| C 9 and lighter | 0.5 max. | <0.1 | | | |
| C10 | 4–10 | 5 | | | |
| C11 | 30–38 | 35 | | | |
| C12 | 29–37 | 32 | | | |
| C13 | 23–30 | 28 | | | |
| C14 and heavier | 0.5 max. | 0.2 | | | |
| C13 and lighter | | | 0.5 max. | 3.5 | |
| C14 and heavier | 0.5 max. | 0.2 | | | |
| C13 and lighter | | | 0.5 max. | 3.5 | |
| C14–C17 | | | 95 min. | 96 | |
| C18 and heavier | | | 1 max. | 0.3 | |
| Boiling Range, °C. | | 192–226 | | 254–287 | |
| Pour Point, °C. | | <0 | | 3 | |
| Flash Point, °C. | | 70 | | 114 | |
| Average Molecular Mass | | 163 | | 219 | |
| Density at 25° C., kg/l | | 0.744 | | | |
| API Gravity at 25° C., ° | | 58.43 | | | |
| Viscosity at 40° C., cst | | | | 2.4 | |

The synthetic fluids of the present invention are prepared by the Fischer-Tropsch process and various modifications thereof (especially the Shell Middle Distillate Synthesis process). See, for example, Sie et al., *Catalysis Today*, bons containing a consecutive number of carbon atoms. In fact, some synthetic fluids contain at least 6, 7, 8, 9, or 10 or more hydrocarbons having a consecutive number of carbon atoms.

The synthetic fluids are commercially available from Sasol in South Africa and MDS(Malaysia) and are preferably the gas oil fraction or a portion of the gas oil fraction or a blend of the gas oil and kerosene fractions obtained from the Shell Middle Distillate Synthesis process.

One or more surfactants (e.g., emulsifiers, wetting agents), viscosifiers, weighting agents, fluid loss control agents, and shale inhibiting salts are also optionally used in the drilling fluid of the present invention. (As used in the specification and claims, the term "surfactant" means a substance that, when present at low concentration in a system, has the property of adsorbing onto the surfaces or interfaces of the system and of altering to a marked degree the surface or interfacial free energies of those surfaces (or interfaces). As used in the foregoing definition of surfactant, the term "interface" indicates a boundary between any two immiscible phases and the term "surface" denotes an interface where one phase is a gas, usually air.) Because the drilling fluids of the present invention are intended to be non-toxic, these optional ingredients, like the synthetic fluid, are preferably also non-toxic.

Exemplary emulsifiers include, but are not limited to, fatty acids, soaps of fatty acids, and fatty acid derivatives including amido-amines, polyamides, polyamines, esters (such as sorbitan monoleate polyethoxylate, sorbitan dioleate polyethoxylate), imidaxolines, and alcohols.

Typical wetting agents include, but are not limited to, lecithin, fatty acids, crude tall oil, oxidized crude tall oil, organic phosphate esters, modified imidazolines, modified amidoamines, alkyl aromatic sulfates, alkyl aromatic sulfonates, and organic esters of polyhydric alcohols.

Exemplary weighting agents include, but are not limited to barite, iron oxide, gelana, siderite, and calcium carbonate.

Common shale inhibiting salts are alkali metal and alkaline-earth metal salts. Calcium chloride and sodium chloride are the preferred shale inhibiting salts.

Exemplary viscosifiers include, but are not limited to, organophilic clays (e.g., hectorite, bentonite, and attapulgite), non-organophilic clays (e.g., montmorillonite (bentonite), hectorite, saponite, attapulgite, and illite), oil soluble polymers, polyamide resins, and polycarboxylic acids and soaps. (As used in the specification and claims, the term "non-organophilic clay" means a clay which has not been amine-treated to convert the clay from water-yielding to oil-yielding.)

Illustrative fluid loss control agents include, but are not limited to, asphaltics (e.g., asphaltenes and sulfonated asphaltenes), amine treated lignite, and gilsonite. For drilling fluids intended for use in high temperature environments (e.g., where the bottom hole temperature exceeds about 204.4° C. (400° F.)), the fluid loss control agent is preferably a polymeric fluid loss control agent. Exemplary polymeric fluid loss control agents include, but are not limited to, polystyrene, polybutadiene, polyethylene, polypropylene, polybutylene, polyisoprene, natural rubber, butyl rubber, polymers consisting of at least two monomers selected from the group consisting of styrene, butadiene, isoprene, and vinyl carboxylic acid. Individual or mixtures of polymeric fluid loss control agents can be used in the drilling fluid of this invention.

For drilling fluids intended for use in high temperature environments (e.g., where the bottom hole temperature exceeds about 204.4° C. (400° F.)), it is desirable to use the synthetic fluid as the base material in conjunction with the formulations and materials disclosed in U.S. patent applications Ser. No. 07/786,034 and Ser. No. 08/268,801, which applications are incorporated herein in their entireties by reference.

General drilling fluid formulations are set forth in the following Table VII:

TABLE VII

| Ingredient | Typical | More Typical |
|---|---|---|
| Synthetic fluid, volume %[a] | 25–85 | 40–60 |
| Surfactant (active), | | |
| ppb[b] | 0.5–40 | 3–25 |
| kg/m$^3$ | 2.86–57.2 | 2.86–28.6 |
| Water, volume %[a] | up to 45 | 1–20 |
| Weighting agent, | | |
| ppb | up to 700 | 150–600 |
| kg/m$^3$ | up to 2002 | 429–1716 |
| Polymer viscosifier, | | |
| ppb | 0.05–15 | 0.1–6 |
| kg/m$^3$ | 0.143–42.9 | 0.286–17.16 |
| Organophilic clay, | | |
| ppb | up to 15 | 0.1–6 |
| kg/m$^3$ | up to 42.9 | 0.286–17.16 |
| Shale inhibiting salt, | | |
| ppb | up to 60 | 5–30 |
| kg/m$^3$ | up to 171.6 | 143–85.8 |
| Lime[c], | | |
| ppb | up to 30 | 1–20 |
| kg/m$^3$ | up to 85.8 | 2.86–57.2 |
| Fluid loss control agent, | | |
| ppb | up to 30 | 2–20 |
| kg/m$^3$ | up to 85.8 | 57.2–57.2 |

[a]Volume percent is based on the total volume of the drilling fluid.
[b]The pounds per barrel (ppb) is based upon the final composition of the drilling fluid.
[c]As used in the specification and claims, the term "lime" means quicklime (CaO), quicklime precursors, and hydrated quicklime (e.g., slaked lime (Ca(OH)$_2$)).

The properties (e.g., synthetic fluid to water ratio, density, etc.) of the drilling fluids of the invention can be adjusted to suit any drilling operation. For example, the drilling fluid is usually formulated to have a volumetric ratio of synthetic fluid to water of about 100:0 to about 40:60 and a density of about 0.9 kg/l (7.5 pounds per gallon (ppg)) to about 2.4 kg/l (20 ppg). More commonly, the density of the drilling fluid is about 1.1 kg/l (9 ppg) to about 2.3 kg/l (19 ppg).

The drilling fluids are preferably prepared by mixing the constituent ingredients in the following order: (a) synthetic fluid, (b) emulsifier, (c) lime, (d) fluid loss control agent, (e) an aqueous solution comprising water and the shale inhibiting salt, (f) organophilic clay (when employed), (g) oil wetting agent, (h) weighting agent, (i) non-sulfonated polymer, (j) sulfonated polymer (when employed), and (k) non-organophilic clay (when employed).

EXAMPLES

The following examples (which are intended to illustrate and not limit the invention defined by the claims) demonstrate the preparation of exemplary drilling fluids within the scope of the present invention.

EXAMPLES 1–6

Preparation of Drilling Fluids

Six drilling fluids (3 lab barrels per drilling fluid formulation, with each lab barrel containing about 350 ml) having a density of about 2.16 kg/l (about 18 ppg) and within the scope of the present invention are formulated by sequentially adding ingredients in the order set forth in Table A. After the addition of each ingredient, the resulting composition is mixed for the indicated mixing time prior to adding a subsequent ingredient to the composition.

TABLE A

| Component | Examples | | | | | | Mixing Time, minutes |
| --- | --- | --- | --- | --- | --- | --- | --- |
| | 1 | 2 | 3 | 4 | 5 | 6 | |
| Synthetic fluid, ml | 164.5 | 164.5 | 164.5 | 164.5 | 164.5 | 164.5 | |
| Primary emulsifier, ml | 8.5 | 8.5 | 8.5 | 8.5 | 8.5 | 8.5 | |
| Lime, g | 8.0 | 8.0 | 8.0 | 8.0 | 8.0 | 8.0 | |
| Fluid loss control agent, g | 10.0 | 10.0 | 10.0 | 10.0 | 10.0 | 10.0 | 20 |
| Brine solution | | | | | | | 10 |
| CaCl$_2$, g | 12.1 | 12.1 | 12.1 | 12.1 | 12.1 | 12.1 | |
| Water, ml | 23.8 | 23.8 | 23.8 | 23.8 | 23.8 | 23.8 | |
| Organophilic clay, g | 1.0 | 2.0 | 3.0 | 2.0 | 2.0 | 1.0 | 20 |
| Oil wetting agent, ml | 6.0 | 6.0 | 6.0 | 6.0 | 6.0 | 6.0 | 10 |
| Weighting Agent, g | 572 | 572 | 572 | 572 | 572 | 572 | 20 |
| Styrene-butadiene polymer, g | 0 | 0 | 0 | 0 | 0 | 2.0 | 10 |
| Polystyrene, g | 3.0 | 3.0 | 3.0 | 4.0 | 2.0 | 3.0 | 10 |
| Bentonite, g | 3.0 | 3.0 | 3.0 | 2.0 | 4.0 | 3.0 | 35 |

EXAMPLE 7

Preparation of Drilling Fluid

An invert emulsion drilling fluid is prepared by (a) initially agitating about 240 ml of a synthetic fluid for about 1 minute using a blender and (b) then sequentially adding the following ingredients (with continuous mixing for about one minute after the addition of each material): (i) about 6 g of a primary emulsifier; (ii) about 8 g of lime (calcium hydroxide); and (iii) about 4 g of a fluid-loss preventing agent.

Subsequently, about 39 ml of fresh water is added to the above mixture and the resulting composition is mixed for about ten minutes. Then, about 11 g of an amine-treated bentonite is added and the resulting mixture is agitated for about 15 minutes.

Thereafter, the following materials are added in sequence, with about 5 minutes of mixing after the addition of each of the materials: (i) about 2 g of a secondary emulsifier; (ii) about 210 g of powdered barite (a non-toxic weighting agent); (iii) about 24 g of calcium chloride dihydrate (to provide salinity to the water phase without water wetting the barite); and (iv) about 20 g of a powdered clay (composed of about 35 weight percent smectite and about 65 weight percent kaolinite) to simulate drilled formation particles.

Although the present invention has been described in detail with reference to some preferred versions, other versions are possible. For example, the synthetic fluid can also be employed as the base liquid component in other wellbore fluids. (As used in the specification and claims, the term "wellbore fluid" means a fluid used while conducting pay zone drilling, underreaming, drilling in, plugging back, sand control, perforating, gravel packing, chemical treatment, hydraulic fracturing, cleanout, well killing, tubing and hardware replacement, and zone selective operations (e.g., well completion operations) as well as a fluid employed as a packer fluid or as a spotting fluid.) In addition to the base liquid, the wellbore fluids contain one or more additional ingredients such as proppants suitable for use in hydraulically fracturing subterranean formations, particulate agents suitable for use in forming a gravel pack, viscosifiers, organophilic clays, and fluid loss control agents.

Common proppants suitable for use in hydraulic fracturing procedures are quartz sand grains, tempered glass beads, sintered bauxite, resin coated sand, aluminum pellets, and nylon pellets. Generally, the proppants are employed in the wellbore fluids intended for use as hydraulic fracturing fluids and are used in concentrations of roughly about 1 to about 10 pounds per gallon of the wellbore fluid. The proppant size is typically smaller than about 2 mesh on the U.S. Sieve Series scale, with the exact size selected being dependent on the particular type of formation to be fractured, the available pressure and pumping rates, as well as other factors known to those skilled in the art.

Typical particulate agents employed in the wellbore fluids used as gravel packing fluids include, but are not limited to, quartz sand grains, glass beads, synthetic resins, resin coated sand, walnut shells, and nylon pellets. The gravel pack particulate agents are generally used in concentrations of about 1 to about 20 pounds per gallon of the wellbore fluid. The size of the particulate agent employed depends on the type of subterranean formation, the average size of formation particles, and other parameters known to those skilled in the art. Generally, particulate agents of about 8 to about 70 mesh on the U.S. Sieve Series scale are used.

Illustrative viscosifiers, organophilic clays, and fluid loss control agents optionally used in wellbore fluids and their concentrations are the same as discussed above in connection with drilling fluids.

The wellbore fluids are prepared by combining the synthetic fluid with any additional additive (e.g., hydraulic fracturing proppants, gravel pack particulate agents, viscosifiers, fluid loss control agents, and organophilic clays). The synthetic fluid typically comprises at least about 50 weight percent of the wellbore fluid, the weight percent being based on the weight of all ingredients present in the wellbore fluid. Accordingly, wellbore fluids containing at least about 60, 70, 80, or even 90 weight percent synthetic fluid are not uncommon. (In fact, in some cases, the synthetic fluid constitutes the entire wellbore fluid.) In terms of the liquid fraction of the wellbore fluid, the synthetic fluid generally comprises from about 50 to 100 weight percent of the liquids employed in wellbore fluids. For example, the synthetic fluid can comprise at least about 60, 70, 80, or 90 weight percent of the liquid portion of the wellbore fluid.

The specific techniques used when employing the wellbore fluid are determined by its intended use and are analogous to methodologies employed when using prior art wellbore fluids for corresponding completion or work-over operations. For example, when the wellbore fluid is employed as a gravel packing fluid, it is typically injected into the formation in accordance with the procedure discussed in U.S. Pat. No. 4,552,215, this patent being incorporated herein in its entirety by reference.

When employed as a fracturing fluid, the wellbore fluid of the present invention is usually injected into the formation using procedures analogous to those disclosed in U.S. Pat. No. 4,488,975; U.S. Pat. No. 4,553,601; Howard et al., *Hydraulic Fracturing*, Society of Petroleum Engineers of the American Institute of Mining, Metallurgical, and Petroleum Engineers, Inc., New York, N.Y. (1970); and Allen et al., *Production Operations, Well completions, Workover, and Stimulation*, 3rd Edition, volume 2, Oil & Gas Consultants International, Inc., Tulsa, Okla. (1989) (Allen), chapter 8; these patents and publications being incorporated herein in their entirety by reference.

When employed in a perforating operation, the wellbore fluid of the present invention is used according to the methodologies disclosed in chapter 7 of Allen, referenced above.

Techniques for using packer fluids and well killing fluids, such as those discussed in chapter 8 of Allen, are also applicable to the wellbore fluid of the present invention.

In addition, because the synthetic fluids of the present invention are lubricous, they can constitute up to about 10, and preferably from about 2 to about 5, weight percent of a water-based drilling fluid. In fact, any moving parts can be lubricated with these synthetic fluids.

Furthermore, while the synthetic fluid is generally manufactured by the Fischer-Tropsch process and various modifications thereof, fluids meeting the specifications set forth above in Tables I–V can also be obtained by further processing various petroleum refinery products (e.g., subjecting a petroleum product to further distillation, hydroisomerization, and/or hydrocracking procedures).

In view of the foregoing numerous other embodiments, the spirit and scope of the appended claims should not necessarily be limited to the description of the preferred versions contained herein.

What is claimed is:

1. A drilling fluid comprising:
   (a) a base fluid; and
   (b) at least one additive selected from the group consisting of emulsifiers, wetting agents, viscosifiers, weighting agents, and fluid loss control agents,
where the base fluid is selected from the group consisting of (A) synthetic fluids having (I) a pour point greater than about −30° C. (−22° F.) and (II) a cetane index greater than about 60, and comprising (i) at least about 95 weight percent hydrocarbons containing 11 or more carbon atoms, (ii) greater than 5 weight percent hydrocarbons containing 18 or more carbon atoms, (iii) at least about 50 weight percent isoparaffins, (iv) at least about 80 weight percent total paraffins, (v) less than 10 weight percent naphthenics, (vi) less than 0.1 weight percent aromatics, and (vii) at least 2 hydrocarbons containing a consecutive number of carbon atoms, and (B) synthetic fluids comprising (i) at least about 95 weight percent hydrocarbons containing 10 or more carbon atoms and (ii) at least about 90 weight percent n-paraffins.

2. The drilling fluid of claim 1 where the base fluid has (I) a pour point greater than about −30° C. (−22° F.) and (II) a cetane index greater than about 60, and comprises (i) at least about 95 weight percent hydrocarbons containing 11 or more carbon atoms, (ii) greater than 5 weight percent hydrocarbons containing 18 or more carbon atoms, (iii) at least about 50 weight percent isoparaffins, (iv) at least about 80 weight percent total paraffins, (v) less than 10 weight percent naphthenics, (vi) less than 0.1 weight percent aromatics, and (vii) at least 2 hydrocarbons containing a consecutive number of carbon atoms.

3. The drilling fluid of claim 2 where the base fluid has a flash point less than 90° C. (194° F.).

4. The drilling fluid of claim 2 where the base fluid has a viscosity at 40° C. (104° F.) of less than about 10 centistokes.

5. The drilling fluid of claim 2 where the base fluid has an API gravity at 15° C. (59° F.) greater than about 40°.

6. The drilling fluid of claim 2 where the base fluid comprises less than 1 weight percent polar activator.

7. The drilling fluid of claim 2 where the base fluid has an initial boiling point of at least about 175° C. (347° F.).

8. The drilling fluid of claim 2 where the base fluid has a final boiling point from about 350° C. (662° F.) to about 375° C. (707° F.).

9. The drilling fluid of claim 2 where the base fluid comprises less than 1 weight percent polar activator and has a flash point less than 90° C. (194° F.), a viscosity at 40° C. (104° F.) of less than about 10 centistokes, an API gravity at 15° C. (59° F.) greater than about 40°, an initial boiling point of at least about 175° C. (347° F.), and a final boiling point from about 350° C. (662° F.) to about 375° C. (707° F.).

10. The drilling fluid of claim 2 where the base fluid comprises at least about 95 weight percent hydrocarbons containing 12 or more carbon atoms.

11. The drilling fluid of claim 2 where the base fluid comprises at least about 95 weight percent hydrocarbons containing 13 or more carbon atoms.

12. The drilling fluid of claim 2 where the base fluid comprises at least about 95 weight percent hydrocarbons containing 14 or more carbon atoms.

13. The drilling fluid of claim 1 where the base fluid comprises at least about 95 weight percent hydrocarbons containing 10 or more carbon atoms and at least about 90 weight percent n-paraffins.

14. The drilling fluid of claim 13 where the base fluid has a naphthenic content of less than about 10 weight percent.

15. The drilling fluid of claim 13 where the base fluid has an aromatic content of less than about 0.1 weight percent.

16. The drilling fluid of claim 13 where the base fluid has a naphthenic content of less than about 10 weight percent and an aromatic content of less than about 0.1 weight percent.

17. The drilling fluid of claim 1 where the base fluid has a sulfur content of less than about 1 weight percent.

18. The drilling fluid of claim 1 where the base fluid has a nitrogen content of less than about 1 weight percent.

19. The drilling fluid of claim 1 where the base fluid has an oxygenate content of less than about 1 weight percent.

20. The drilling fluid of claim 1 where the base fluid has a sulfur content of less than about 1 weight percent, a nitrogen content of less than about 1 weight percent, and an oxygenate content of less than about 1 weight percent.

21. The drilling fluid of claim 1 where the base fluid has (I) a pour point greater than about −30° C. (−22° F.) and (II) a cetane index greater than 50, and comprises (i) at least about 95 weight percent hydrocarbons containing 12 or more carbon atoms, (ii) greater than 10 weight percent hydrocarbons containing 18 or more carbon atoms, (iii) at least about 50 weight percent isoparaffins, (iv) at least about 85 weight percent total paraffins, (v) less than 5 weight percent naphthenics, (vi) less than 0.05 weight percent aromatics, (vii) at least 2 hydrocarbons containing a consecutive number of carbon atoms, (viii) less than about 0.5 weight percent sulfur, (ix) less than about 0.5 weight percent nitrogen, and (x) less than about 0.5 weight percent oxygenates.

22. The drilling fluid of claim 1 where the base fluid has (I) a pour point greater than about −30° C. (−22° F.) and (II) a cetane index greater than 50, and comprises (i) at least about 95 weight percent hydrocarbons containing 13 or more carbon atoms, (ii) greater than 15 weight percent hydrocarbons containing 18 or more carbon atoms, (iii) at least about 50 weight percent isoparaffins, (iv) at least about 90 weight percent total paraffins, (v) less than 1 weight percent naphthenics, (vi) less than 0.01 weight percent aromatics, (vii) at least 2 hydrocarbons containing a consecutive number of carbon atoms, (viii) less than about 0.1 weight percent sulfur, (ix) less than about 0.1 weight percent nitrogen, and (x) less than about 0.1 weight percent oxygenates.

23. A method for drilling a borehole in a subterranean formation, the method comprising the steps of:
   (A) rotating a drill bit at the bottom of the borehole; and
   (B) introducing the drilling fluid of claim 1 into the borehole (i) to pick up drill cuttings and (ii) to carry at least a portion of the drill cuttings out of the borehole.

24. A wellbore fluid comprising:
   (a) at least one additive selected from the group consisting of emulsifiers, wetting agents, viscosifiers, weighting agents, fluid loss control agents, proppants for use in hydraulically fracturing subterranean formations, and particulate agents for use in forming a gravel pack; and
   (b) a synthetic fluid selected from the group consisting of (A) synthetic fluids having (I) a pour point greater than about −30° C. (−22° F.) and (II) a cetane index greater than 50, and comprising (i) at least about 95 weight percent hydrocarbons containing 11 or more carbon atoms, (ii) greater than 5 weight percent hydrocarbons containing 18 or more carbon atoms, (iii) at least about 50 weight percent isoparaffins, (iv) at least about 80 weight percent total paraffins, (v) less than 10 weight percent naphthenics, (vi) less than 0.1 weight percent aromatics, and (vii) at least 2 hydrocarbons containing a consecutive number of carbon atoms, and (B) synthetic fluids comprising (i) at least about 95 weight percent hydrocarbons containing 10 or more carbon atoms and (ii) at least about 90 weight percent n-paraffins.

25. A method for treating a well, the method comprising the step of injecting the wellbore fluid of claim 24 into the well.

26. A method for treating a well, the method comprising the step of injecting a synthetic fluid into the well, where the synthetic fluid is selected from the group consisting of (A) synthetic fluids having (I) a pour point greater than about −30° C. (−22° F.) and (II) a cetane index greater than 50, and comprising (i) at least about 95 weight percent hydrocarbons containing 11 or more carbon atoms, (ii) greater than 5 weight percent hydrocarbons containing 18 or more carbon atoms, (iii) at least about 50 weight percent isoparaffins, (iv) at least about 80 weight percent total paraffins, (v) less than 10 weight percent naphthenics, (vi) less than 0.1 weight percent aromatics, and (vii) at least 2 hydrocarbons containing a consecutive number of carbon atoms, and (B) synthetic fluids comprising (i) at least about 95 weight percent hydrocarbons containing 10 or more carbon atoms and (ii) at least about 90 weight percent n-paraffins.

27. A water-base drilling fluid comprising:
   (a) water;
   (b) at least one additive selected from the group consisting of emulsifiers and weighting agents; and
   (c) a synthetic fluid,
   where (i) the synthetic fluid constitutes up to about 10 weight percent of the water-base drilling fluid and (ii) the synthetic fluid is selected from the group consisting of (A) synthetic fluids having (I) a pour point greater than about −30° C. (−22° F.) and (II) a cetane index greater than 50, and comprising (i) at least about 95 weight percent hydrocarbons containing 11 or more carbon atoms, (ii) greater than 5 weight percent hydrocarbons containing 18 or more carbon atoms, (iii) at least about 50 weight percent isoparaffins, (iv) at least about 80 weight percent total paraffins, (v) less than 10 weight percent naphthenics, (vi) less than 0.1 weight percent aromatics, and (vii) at least 2 hydrocarbons containing a consecutive number of carbon atoms, and (B) synthetic fluids comprising (i) at least about 95 weight percent hydrocarbons containing 10 or more carbon atoms and (ii) at least about 90 weight percent n-paraffins.

28. A method for drilling a borehole in a subterranean formation, the method comprising the steps of:
   (A) rotating a drill bit at the bottom of the borehole; and
   (B) introducing the water-base drilling fluid of claim 32 into the borehole (i) to pick up drill cuttings and (ii) to carry at least a portion of the drill cuttings out of the borehole.

29. The drilling fluid of claim 2 where the base fluid has a pour point greater than about −25° C. (−13° F.).

30. The drilling fluid of claim 2 where the base fluid has a pour point greater than about −20° C. (−4° F.).

31. The drilling fluid of claim 2 where the base fluid has a pour point greater than about −15° C. (5° F.).

32. The drilling fluid of claim 2 where the base fluid comprises greater than 10 weight percent hydrocarbons containing 18 or more carbon atoms.

33. The drilling fluid of claim 2 where the base fluid comprises greater than 15 weight percent hydrocarbons containing 18 or more carbon atoms.

34. The drilling fluid of claim 2 where the base fluid comprises greater than 20 weight percent hydrocarbons containing 18 or more carbon atoms.

35. The drilling fluid of claim 2 where the base fluid comprises greater than 25 weight percent hydrocarbons containing 18 or more carbon atoms.

36. The drilling fluid of claim 2 where the base fluid comprises greater than 30 weight percent hydrocarbons containing 18 or more carbon atoms.

37. The drilling fluid of claim 2 where the base fluid comprises greater than 35 weight percent hydrocarbons containing 18 or more carbon atoms.

38. The drilling fluid of claim 2 where the base fluid comprises greater than 40 weight percent hydrocarbons containing 18 or more carbon atoms.

39. The drilling fluid of claim 2 where the base fluid comprises greater than 50 weight percent hydrocarbons containing 18 or more carbon atoms.

40. The drilling fluid of claim 2 where the base fluid comprises at least 60 weight percent isoparaffins.

41. The drilling fluid of claim 2 where the base fluid comprises at least 90 weight percent total paraffins.

42. The drilling fluid of claim 2 where the base fluid comprises at least 92.5 weight percent total paraffins.

43. The drilling fluid of claim 2 where the base fluid comprises at least 95 weight percent total paraffins.

44. The drilling fluid of claim 2 where the base fluid comprises at least 96 weight percent total paraffins.

45. The drilling fluid of claim 2 where the base fluid comprises at least 97 weight percent total paraffins.

46. The drilling fluid of claim 2 where the base fluid comprises at least 98 weight percent total paraffins.

47. The drilling fluid of claim 2 where the base fluid comprises at least 99 weight percent total paraffins.

48. The drilling fluid of claim 2 where the base fluid comprises 5 weight percent or less naphthenics.

49. The drilling fluid of claim 2 where the base fluid comprises 1 weight percent or less naphthenics.

50. The drilling fluid of claim 2 where the base fluid comprises 0.5 weight percent or less naphthenics.

51. The drilling fluid of claim 2 where the base fluid comprises 0.1 weight percent or less naphthenics.

52. The drilling fluid of claim 2 where the base fluid comprises 0.05 weight percent or less naphthenics.

53. The drilling fluid of claim 2 where the base fluid comprises 0.01 weight percent or less naphthenics.

54. The drilling fluid of claim 2 where the base fluid comprises 0.005 weight percent or less naphthenics.

55. The drilling fluid of claim 2 where the base fluid comprises 0.001 weight percent or less naphthenics.

56. The drilling fluid of claim 2 where the base fluid comprises 0.0005 weight percent or less naphthenics.

57. The drilling fluid of claim 2 where the base fluid comprises 0.0001 weight percent or less naphthenics.

58. The drilling fluid of claim 2 where the base fluid comprises at least 3 hydrocarbons containing a consecutive number of carbon atoms.

59. The drilling fluid of claim 2 where the base fluid comprises at least 4 hydrocarbons containing a consecutive number of carbon atoms.

60. The drilling fluid of claim 2 where the base fluid comprises at least 5 hydrocarbons containing a consecutive number of carbon atoms.

61. The drilling fluid of claim 2 where the base fluid comprises at least 6 hydrocarbons containing a consecutive number of carbon atoms.

62. The drilling fluid of claim 2 where the base fluid comprises at least 7 hydrocarbons containing a consecutive number of carbon atoms.

63. The drilling fluid of claim 2 where the base fluid comprises at least 8 hydrocarbons containing a consecutive number of carbon atoms.

64. The drilling fluid of claim 2 where the base fluid comprises at least 9 hydrocarbons containing a consecutive number of carbon atoms.

65. The drilling fluid of claim 2 where the base fluid comprises at least 10 hydrocarbons containing a consecutive number of carbon atoms.

66. The drilling fluid of claim 2 where the base fluid comprises 0.05 weight percent or less aromatics.

67. The drilling fluid of claim 2 where the base fluid comprises 0.01 weight percent or less aromatics.

68. The drilling fluid of claim 2 where the base fluid comprises 0.005 weight percent or less aromatics.

69. The drilling fluid of claim 2 where the base fluid comprises 0.001 weight percent or less aromatics.

70. The drilling fluid of claim 2 where the base fluid comprises 0.0005 weight percent or less aromatics.

71. The drilling fluid of claim 2 where the base fluid comprises 0.0001 weight percent or less aromatics.

72. The drilling fluid of claim 2 where the base fluid has a flash point of at least about 65.6° C. (150° F.).

73. The drilling fluid of claim 2 where the base fluid has a flash point of at least about 71.1° C. (160° F.).

74. The drilling fluid of claim 2 where the base fluid has a flash point of at least about 79.4° C. (175° F.).

75. The drilling fluid of claim 2 where the base fluid has a flash point of at least about 82.2° C. (180° F.).

76. The drilling fluid of claim 2 where the base fluid has a flash point of at least about 85° C. (185° F.).

77. The drilling fluid of claim 2 where the base fluid has a viscosity at 40° C. of less than about 6 centistokes.

78. The drilling fluid of claim 2 where the base fluid has a viscosity at 40° C. of less than about 5 centistokes.

79. The drilling fluid of claim 2 where the base fluid has an initial boiling point of at least about 180° C. (356° F.).

80. The drilling fluid of claim 2 where the base fluid has an initial boiling point of at least about 185° C. (365° F.).

81. The drilling fluid of claim 2 where the base fluid has an initial boiling point of at least about 190° C. (374° F.).

82. The drilling fluid of claim 2 where the base fluid has an initial boiling point of at least about 200° C. (392° F.).

83. The drilling fluid of claim 2 where the base fluid has a final boiling point of about 370° C. (698° F.) or less.

84. The drilling fluid of claim 2 where the base fluid has a final boiling point of about 365° C. (689° F.) or less.

85. The drilling fluid of claim 2 where the base fluid has a final boiling point of about 360° C. (680° F.) or less.

86. The drilling fluid of claim 2 where the base fluid has a sulfur content of less than about 1 weight percent.

87. The drilling fluid of claim 2 where the base fluid has a sulfur content of 0.5 weight percent or less.

88. The drilling fluid of claim 2 where the base fluid has a sulfur content of 0.1 weight percent or less.

89. The drilling fluid of claim 2 where the base fluid has a sulfur content of 0.05 weight percent or less.

90. The drilling fluid of claim 2 where the base fluid has a sulfur content of 0.01 weight percent or less.

91. The drilling fluid of claim 2 where the base fluid has a sulfur content of 0.005 weight percent or less.

92. The drilling fluid of claim 2 where the base fluid has a sulfur content of 0.001 weight percent or less.

93. The drilling fluid of claim 2 where the base fluid has a sulfur content of 0.0005 weight percent or less.

94. The drilling fluid of claim 2 where the base fluid has a sulfur content of 0.0001 weight percent or less.

95. The drilling fluid of claim 2 where the base fluid has a nitrogen content of less than about 1 weight percent.

96. The drilling fluid of claim 2 where the base fluid has a nitrogen content of 0.5 weight percent or less.

97. The drilling fluid of claim 2 where the base fluid has a nitrogen content of 0.1 weight percent or less.

98. The drilling fluid of claim 2 where the base fluid has a nitrogen content of 0.05 weight percent or less.

99. The drilling fluid of claim 2 where the base fluid has a nitrogen content of 0.01 weight percent or less.

100. The drilling fluid of claim 2 where the base fluid has a nitrogen content of 0.005 weight percent or less.

101. The drilling fluid of claim 2 where the base fluid has a nitrogen content of 0.001 weight percent or less.

102. The drilling fluid of claim 2 where the base fluid has a nitrogen content of 0.0005 weight percent or less.

103. The drilling fluid of claim 2 where, the base fluid has a nitrogen content of 0.0001 weight percent or less.

104. The drilling fluid of claim 2 where the base fluid has an oxygenate content of less than about 1 weight percent.

105. The drilling fluid of claim 2 where the base fluid has an oxygenate content of 0.5 weight percent or less.

106. The drilling fluid of claim 2 where the base fluid has an oxygenate content of 0.1 weight percent or less.

107. The drilling fluid of claim 2 where the base fluid has an oxygenate content of 0.05 weight percent or less.

108. The drilling fluid of claim 2 where the base fluid has an oxygenate content of 0.01 weight percent or less.

109. The drilling fluid of claim 2 where the base fluid has an oxygenate content of 0.005 weight percent or less.

110. The drilling fluid of claim 2 where the base fluid has an oxygenate content of 0.001 weight percent or less.

111. The drilling fluid of claim 2 where the base fluid has an oxygenate content of 0.0005 weight percent or less.

112. The drilling fluid of claim 2 where the base fluid has an oxygenate content of 0.0001 weight percent or less.

113. The drilling fluid of claim 2 where the base fluid has (a) a pour point greater than about −25° C. (−13° F.), (b) a cetane index greater than about 62, (c) an initial boiling point of a least about 175° C. (347° F.), (d) a final boiling point of about 375° C. (707° F.) or less, (e) a flash point of at least about 65.6° C. (150° F.), and (f) a viscosity at 40° C. of less than 6 centistokes, and comprises (i) at least about 95 weight percent hydrocarbons containing 11 or more carbon atoms, (ii) greater than 10 weight percent hydrocarbons containing 18 or more carbon atoms, (iii) at least about 50 weight percent isoparaffins, (iv) at least about 90 weight percent total paraffins, (v) 5 weight percent or less naphthenics, (vi) less than 0.1 weight percent aromatics, (vii) at least 3 hydrocarbons containing a consecutive number of carbon atoms, and (viii) less than about 1 weight percent sulfur.

114. The drilling fluid of claim 2 where the base fluid has (a) a pour point greater than about −20° C. (−4° F.), (b) a cetane index greater than about 64, (c) an initial boiling point of a least about 175° C. (347° F.), (d) a final boiling point of about 370° C. (698° F.) or less, (e) a flash point of at least about 65.6° C. (150° F.), and (f) a viscosity at 40° C. of less than 6 centistokes, and comprises (i) at least about 95 weight percent hydrocarbons containing 11 or more carbon atoms, (ii) greater than 10 weight percent hydrocarbons containing 18 or more carbon atoms, (iii) at least about 50 weight percent isoparaffins, (iv) at least about 90 weight percent total paraffins, (v) 5 weight percent or less naphthenics, (vi) less than 0.1 weight percent aromatics, (vii) at least 3 hydrocarbons containing a consecutive number of carbon atoms, and (viii) less than about 0.5 weight percent sulfur.

115. The drilling fluid of claim 2 where the base fluid has (a) a pour point greater than about −15° C. (5° F.), (b) a cetane index greater than about 66, (c) an initial boiling point of a least about 175° C. (347° F.), (d) a final boiling point of about 365° C. (689° F.) or less, (e) a flash point of at least about 65.6° C. (150° F.), and (f) a viscosity at 40° C. of less than 6 centistokes, and comprises (i) at least about 95 weight percent hydrocarbons containing 11 or more carbon atoms, (ii) greater than 10 weight percent hydrocarbons containing 18 or more carbon atoms, (iii) at least about 50 weight percent isoparaffins, (iv) at least about 90 weight percent total paraffins, (v) 5 weight percent or less naphthenics, (vi) less than 0.1 weight percent aromatics, (vii) at least 3 hydrocarbons containing a consecutive number of carbon atoms, and (viii) less than about 0.1 weight percent sulfur.

116. The drilling fluid of claim 2 where the base fluid has (a) a pour point greater than about −15° C. (5° F.), (b) a cetane index greater than about 68, (c) an initial boiling point of a least about 175° C. (347° F.), (d) a final boiling point of about 360° C. (680° F.) or less, (e) a flash point of at least about 65.6° C. (150° F.), and (f) a viscosity at 40° C. of less than 6 centistokes, and comprises (i) at least about 95 weight percent hydrocarbons containing 11 or more carbon atoms, (ii) greater than 10 weight percent hydrocarbons containing 18 or more carbon atoms, (iii) at least about 50 weight percent isoparaffins, (iv) at least about 90 weight percent total paraffins, (v) 5 weight percent or less naphthenics, (vi) less than 0.1 weight percent aromatics, (vii) at least 3 hydrocarbons containing a consecutive number of carbon atoms, and (viii) less than about 0.05 weight percent sulfur.

117. The drilling fluid of claim 2 where the base fluid has (a) a pour point greater than about −15° C. (5° F.), (b) a cetane index of at least about 70, (c) an initial boiling point of a least about 175° C. (347° F.), (d) a final boiling point of about 360° C. (680° F.) or less, (e) a flash point of at least about 65.6° C. (150° F.), and (f) a viscosity at 40° C. of less than 6 centistokes, and comprises (i) at least about 95 weight percent hydrocarbons containing 11 or more carbon atoms, (ii) greater than 10 weight percent hydrocarbons containing 18 or more carbon atoms, (iii) at least about 50 weight percent isoparaffins, (iv) at least about 90 weight percent total paraffins, (v) 5 weight percent or less naphthenics, (vi) less than 0.1 weight percent aromatics, (vii) at least 3 hydrocarbons containing a consecutive number of carbon atoms, and (viii) less than about 0.05 weight percent sulfur.

118. The drilling fluid of claim 2 where the base fluid has (a) a pour point greater than about −15° C. (5° F.), (b) a cetane index of at least about 70, (c) an initial boiling point of a least about 175° C. (347° F.), (d) a final boiling point of about 360° C. (680° F.) or less, (e) a flash point of at least about 65.6° C. (150° F.), and (f) a viscosity at 40° C. of less than 6 centistokes, and comprises (i) at least about 95 weight percent hydrocarbons containing 12 or more carbon atoms, (ii) greater than 15 weight percent hydrocarbons containing 18 or more carbon atoms, (iii) at least about 50 weight percent isoparaffins, (iv) at least about 92.5 weight percent total paraffins, (v) 1 weight percent or less naphthenics, (vi) less than 0.1 weight percent aromatics, (vii) at least 4 hydrocarbons containing a consecutive number of carbon atoms, and (viii) less than about 0.05 weight percent sulfur.

119. The drilling fluid of claim 2 where the base fluid has (a) a pour point greater than about −15° C. (5° F.), (b) a cetane index of at least about 70, (c) an initial boiling point of a least about 175° C. (347° F.), (d) a final boiling point of about 360° C. (680° F.) or less, (e) a flash point of at least about 65.6° C. (150° F.), and (f) a viscosity at 40° C. of less than 6 centistokes, and comprises (i) at least about 95 weight percent hydrocarbons containing 12 or more carbon atoms, (ii) greater than 20 weight percent hydrocarbons containing 18 or more carbon atoms, (iii) at least about 50 weight percent isoparaffins, (iv) at least about 95 weight percent total paraffins, (v) 0.5 weight percent or less naphthenics, (vi) less than 0.1 weight percent aromatics, (vii) at least 5 hydrocarbons containing a consecutive number of carbon atoms, and (viii) less than about 0.05 weight percent sulfur.

120. The drilling fluid of claim 2 where the base fluid has (a) a pour point greater than about −15° C. (5° F.), (b) a cetane index of at least about 70, (c) an initial boiling point of a least about 175° C. (347° F.), (d) a final boiling point of about 360° C. (680° F.) or less, (e) a flash point of at least about 65.6° C. (150° F.) and (f) a viscosity at 40° C. of less than 6 centistokes, and comprises (i) at least about 95 weight percent hydrocarbons containing 12 or more carbon atoms, (ii) greater than 25 weight percent hydrocarbons containing 18 or more carbon atoms, (iii) at least about 50 weight percent isoparaffins, (iv) at least about 96 weight percent total paraffins, (v) 0.1 weight percent or less naphthenics, (vi) less than 0.1 weight percent aromatics, (vii) at least 6 hydrocarbons containing a consecutive number of carbon atoms, and (viii) less than about 0.05 weight percent sulfur.

121. The drilling fluid of claim 2 where the base fluid has (a) a pour point greater than about −15° C. (5° F.), (b) a cetane index of at least about 70, (c) an initial boiling point of a least about 175° C. (347° F.), (d) a final boiling point of about 360° C. (680° F.) or less, (e) a flash point of at least about 65.6° C. (150° F.), and (f) a viscosity at 40° C. of less than 6 centistokes, and comprises (i) at least about 95 weight percent hydrocarbons containing 12 or more carbon atoms, (ii) greater than 30 weight percent hydrocarbons containing 18 or more carbon atoms, (iii) at least about 50 weight percent isoparaffins, (iv) at least about 97 weight percent total paraffins, (v) 0.1 weight percent or less naphthenics, (vi) less than 0.1 weight percent aromatics, (vii) at least 7 hydrocarbons containing a consecutive number of carbon atoms, and (viii) less than about 0.05 weight percent sulfur.

122. The drilling fluid of claim 2 where the base fluid has (a) a pour point greater than about −15° C. (5° F.), (b) a cetane index of at least about 70, (c) an initial boiling point of a least about 175° C. (347° F.), (d) a final boiling point of about 360° C. (680° F.) or less, (e) a flash point of at least about 65.6° C. (150° F.), and (f) a viscosity at 40° C. of less than 6 centistokes, and comprises (i) at least about 95 weight percent hydrocarbons containing 12 or more carbon atoms, (ii) greater than 35 weight percent hydrocarbons containing 18 or more carbon atoms, (iii) at least about 50 weight percent isoparaffins, (iv) at least about 98 weight percent total paraffins, (v) 0.1 weight percent or less naphthenics, (vi) less than 0.1 weight percent aromatics, (vii) at least 8 hydrocarbons containing a consecutive number of carbon atoms, and (viii) less than about 0.05 weight percent sulfur.

123. The drilling fluid of claim 2 where the base fluid has (a) a pour point greater than about −15° C. (5° F.), (b) a cetane index of at least about 70, (c) an initial boiling point of a least about 175° C. (347° F.), (d) a final boiling point of about 360° C. (680° F.) or less, (e) a flash point of at least about 65.6° C. (150° F.), and (f) a viscosity at 40° C. of less than 6 centistokes, and comprises (i) at least about 95 weight percent hydrocarbons containing 12 or more carbon atoms, (ii) greater than 40 weight percent hydrocarbons containing 18 or more carbon atoms, (iii) at least about 50 weight percent isoparaffins, (iv) at least about 99 weight percent total paraffins, (v) 0.1 weight percent or less naphthenics, (vi) less than 0.1 weight percent aromatics, (vii) at least 9 hydrocarbons containing a consecutive number of carbon atoms, and (viii) less than about 0.05 weight percent sulfur.

124. The drilling fluid of claim 2 where the base fluid has (a) a pour point greater than about −15° C. (5° F.), (b) a cetane index of at least about 70, (c) an initial boiling point of a least about 175° C. (347° F.), (d) a final boiling point of about 360° C. (680° F.) or less, (e) a flash point of at least about 65.6° C. (150° F.), and (f) a viscosity at 40° C. of less than 6 centistokes, and comprises (i) at least about 95 weight percent hydrocarbons containing 12 or more carbon atoms, (ii) greater than 40 weight percent hydrocarbons containing 18 or more carbon atoms, (iii) at least about 60 weight percent isoparaffins, (iv) at least about 99 weight percent total paraffins, (v) 0.1 weight percent or less naphthenics, (vi) less than 0.1 weight percent aromatics, (vii) at least 9 hydrocarbons containing a consecutive number of carbon atoms, and (viii) less than about 0.05 weight percent sulfur.

125. The drilling fluid of claim 124 where the base fluid comprises greater than 50 weight percent hydrocarbons containing 18 or more carbon atoms.

126. The drilling fluid of claim 124 where the base fluid comprises 0.05 weight percent or less naphthenics.

127. The drilling fluid of claim 124 where the base fluid comprises 0.01 weight percent or less naphthenics.

128. The drilling fluid of claim 124 where the base fluid comprises 0.005 weight percent or less naphthenics.

129. The drilling fluid of claim 124 where the base fluid comprises 0.001 weight percent or less naphthenics.

130. The drilling fluid of claim 124 where the base fluid comprises 0.0005 weight percent or less naphthenics.

131. The drilling fluid of claim 124 where the base fluid comprises 0.0001 weight percent or less naphthenics.

132. The drilling fluid of claim 124 where the base fluid comprises at least 10 hydrocarbons containing a consecutive number of carbon atoms.

133. The drilling fluid of claim 124 where the base fluid comprises 0.05 weight percent or less aromatics.

134. The drilling fluid of claim 124 where the base fluid comprises 0.01 weight percent or less aromatics.

135. The drilling fluid of claim 124 where the base fluid comprises 0.005 weight percent or less aromatics.

136. The drilling fluid of claim 124 where the base fluid comprises 0.001 weight percent or less aromatics.

137. The drilling fluid of claim 124 where the base fluid comprises 0.0005 weight percent or less aromatics.

138. The drilling fluid of claim 124 where the base fluid comprises 0.0001 weight percent or less aromatics.

139. The drilling fluid of claim 124 where the base fluid has a flash point of at least about 71.1° C. (160° F.).

140. The drilling fluid of claim 124 where the base fluid has a flash point of at least about 79.4° C. (175° F.).

141. The drilling fluid of claim 124 where the base fluid has a flash point of at least about 82.2° C. (180° F.).

142. The drilling fluid of claim 124 where the base fluid has a flash point of at least about 85° C. (185° F.).

143. The drilling fluid of claim 124 where the base fluid has a viscosity at 40° C. of less than about 5 centistokes.

144. The drilling fluid of claim 124 where the base fluid has an initial boiling point of at least about 180° C. (356° F.).

145. The drilling fluid of claim 124 where the base fluid has an initial boiling point of at least about 185° C. (365° F.).

146. The drilling fluid of claim 124 where the base fluid has an initial boiling point of at least about 190° C. (374° F.).

147. The drilling fluid of claim 124 where the base fluid has an initial boiling point of at least about 200° C. (392° F.).

148. The drilling fluid of claim 124 where the base fluid has a sulfur content of 0.01 weight percent or less.

149. The drilling fluid of claim 124 where the base fluid has a sulfur content of 0.005 weight percent or less.

150. The drilling fluid of claim 124 where the base fluid has a sulfur content of 0.001 weight percent or less.

151. The drilling fluid of claim 124 where the base fluid has a sulfur content of 0.0005 weight percent or less.

152. The drilling fluid of claim 124 where the base fluid has a sulfur content of 0.0001 weight percent or less.

153. The drilling fluid of claim 124 where the base fluid has a nitrogen content of less than about 1 weight percent.

154. The drilling fluid of claim 124 where the base fluid has a nitrogen content of 0.5 weight percent or less.

155. The drilling fluid of claim 124 where the base fluid has a nitrogen content of 0.1 weight percent or less.

156. The drilling fluid of claim 124 where the base fluid has a nitrogen content of 0.05 weight percent or less.

157. The drilling fluid of claim 124 where the base fluid has a nitrogen content of 0.01 weight percent or less.

158. The drilling fluid of claim 124 where the base fluid has a nitrogen content of 0.005 weight percent or less.

159. The drilling fluid of claim 124 where the base fluid has a nitrogen content of 0.001 weight percent or less.

160. The drilling fluid of claim 124 where the base fluid has a nitrogen content of 0.0005 weight percent or less.

161. The drilling fluid of claim 124 where the base fluid has a nitrogen content of 0.0001 weight percent or less.

162. The drilling fluid of claim 124 where the base fluid has an oxygenate content of less than about 1 weight percent.

163. The drilling fluid of claim 124 where the base fluid has an oxygenate content of 0.5 weight percent or less.

164. The drilling fluid of claim 124 where the base fluid has an oxygenate content of 0.1 weight percent or less.

165. The drilling fluid of claim 124 where the base fluid has an oxygenate content of 0.05 weight percent or less.

166. The drilling fluid of claim 124 where the base fluid has an oxygenate content of 0.01 weight percent or less.

167. The drilling fluid of claim 124 where the base fluid has an oxygenate content of 0.005 weight percent or less.

168. The drilling fluid of claim 124 where the base fluid has an oxygenate content of 0.001 weight percent or less.

169. The drilling fluid of claim 124 where the base fluid has an oxygenate content of 0.0005 weight percent or less.

170. The drilling fluid of claim 124 where the base fluid has an oxygenate content of 0.0001 weight percent or less.

* * * * *

UNITED STATES PATENT AND TRADEMARK OFFICE
CERTIFICATE OF CORRECTION

PATENT NO. : 5,635,457
DATED : June 3, 1997
INVENTOR(S) : Donald C. Van Slyke

It is certified that error appears in the above-identified patent and that said Letters Patent is hereby corrected as shown below:

Column 3, line 13, replace "ASTM D 5186" with
-- ASTM D 2887 --.

Column 3, line 15, replace "ASTM D 2887" with
-- ASTM D 5186 --.

Claim 28, column 16, line 24, replace "32" with
-- 27 --.

Claim 103, column 18, line 56, after "where"
delete -- , --.

Signed and Sealed this

Seventeenth Day of March, 1998

Attest:

BRUCE LEHMAN

Attesting Officer

Commissioner of Patents and Trademarks